(12) United States Patent
Capito et al.

(10) Patent No.: US 8,083,041 B2
(45) Date of Patent: Dec. 27, 2011

(54) ELECTROHYDRAULIC TORQUE TRANSFER DEVICE

(75) Inventors: Russell T. Capito, Clarkston, MI (US); Charles G. Stuart, Rochester Hills, MI (US); Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 897 days.

(21) Appl. No.: 12/119,747

(22) Filed: May 13, 2008

(65) Prior Publication Data

US 2008/0214355 A1 Sep. 4, 2008

Related U.S. Application Data

(63) Continuation-in-part of application No. 11/201,468, filed on Aug. 11, 2005, now Pat. No. 7,445,106.

(51) Int. Cl.
*F16D 67/04* (2006.01)
*F16D 43/28* (2006.01)

(52) U.S. Cl. ............... 192/13 R; 192/85.48; 192/85.63; 192/82 T

(58) Field of Classification Search ................... None
See application file for complete search history.

(56) References Cited

U.S. PATENT DOCUMENTS

| | | | |
|---|---|---|---|
| 3,546,969 A | 12/1970 | Gibson et al. | |
| 4,862,769 A | 9/1989 | Koga et al. | |
| 4,909,371 A | 3/1990 | Okamoto et al. | |
| 4,923,029 A | 5/1990 | Lanzer | |
| 5,148,903 A | 9/1992 | Kobayashi et al. | |
| 5,224,906 A | 7/1993 | Sturm | |
| 5,680,917 A | 10/1997 | Bray | |
| 5,811,948 A | 9/1998 | Sato et al. | |
| 5,960,922 A | 10/1999 | Riess et al. | |
| 6,315,097 B1 | 11/2001 | Burns | |
| 6,398,686 B1 | 6/2002 | Irwin | |
| 6,461,267 B1 | 10/2002 | Paielli | |

(Continued)

FOREIGN PATENT DOCUMENTS

DE 102006037838 A1 3/2007

(Continued)

OTHER PUBLICATIONS

International Preliminary Report on Patentability (Chapter I) for PCT/US2009/041926 issued by the International Bureau of WIPO on Nov. 17, 2010.

(Continued)

*Primary Examiner* — Rodney Bonck
(74) *Attorney, Agent, or Firm* — Harness, Dickey & Pierce, P.L.C.

(57) ABSTRACT

A power transmission device includes an actuator having an electric motor driving a pump to supply pressurized fluid to a piston acting on a friction clutch to transfer torque between rotatable input and output members. In one instance, a valve between the pump outlet and the piston selectively traps pressurized fluid acting on the piston without continued energization of the electric motor. A gerotor may be formed from a material having a first coefficient of thermal expansion and a housing formed from a material having a second lower coefficient of thermal expansion to vary pump component clearances as the viscosity of the pumped fluid changes with changes in temperature. A method of controlling the power transmission device includes defining a correlation between pump speed, fluid temperature and fluid pressure, determining fluid temperature, determining pump speed, and rotating the pump to transfer a predetermined quantity of torque.

18 Claims, 9 Drawing Sheets

U.S. PATENT DOCUMENTS

| | | |
|---|---|---|
| 6,581,741 B2 | 6/2003 | Taureg |
| 6,595,086 B2 | 7/2003 | Kobayashi |
| 6,672,420 B2 | 1/2004 | Porter |
| 6,681,912 B2 | 1/2004 | Suzuki et al. |
| 6,681,913 B2 | 1/2004 | Lee |
| 6,725,989 B1 | 4/2004 | Krisher et al. |
| 6,745,879 B1 | 6/2004 | Dolan |
| 6,817,434 B1 | 11/2004 | Sweet |
| 6,848,555 B2 | 2/2005 | Sakata et al. |
| 6,945,374 B2 | 9/2005 | Puiu |
| 7,210,566 B2 | 5/2007 | Baxter, Jr. |
| 7,296,669 B2 | 11/2007 | Quehenberger et al. |
| 7,369,930 B2 | 5/2008 | Hsieh et al. |
| 7,445,106 B2 | 11/2008 | Capito |
| 7,743,899 B2 | 6/2010 | Capito |
| 2001/0022507 A1 | 9/2001 | Marinus et al. |
| 2002/0162722 A1 | 11/2002 | Suzuki et al. |
| 2003/0230461 A1 | 12/2003 | Sakata et al. |
| 2004/0129475 A1 | 7/2004 | Forsyth et al. |
| 2004/0159520 A1* | 8/2004 | Anwar et al. ............ 192/70.12 |
| 2004/0251070 A1 | 12/2004 | Sakata et al. |
| 2005/0167224 A1 | 8/2005 | Puiu |
| 2006/0000685 A1 | 1/2006 | Puiu |
| 2007/0175721 A1 | 8/2007 | Nett et al. |
| 2007/0215428 A1 | 9/2007 | Capito |
| 2008/0064569 A1 | 3/2008 | Baxter et al. |
| 2010/0210390 A1* | 8/2010 | Ekonen et al. ................ 475/86 |

FOREIGN PATENT DOCUMENTS

| | | |
|---|---|---|
| EP | 0278588 A1 | 8/1988 |
| JP | 58 091927 | 6/1983 |
| JP | 9071142 A | 3/1997 |
| JP | 09 112592 | 5/1997 |
| JP | 2002326522 A | 11/2002 |
| KR | 10-1989-0000272 | 3/1989 |
| WO | 02079661 A1 | 10/2002 |
| WO | WO 02/079664 | 10/2002 |
| WO | 2005009774 A1 | 2/2005 |

OTHER PUBLICATIONS

International Search Report for International Application No. PCT/US2009/041926, dated Dec. 16, 2009.

Written Opinion for International Application No. PCT/US2009/041926, dated Dec. 16, 2009, 4 pgs.

International Search Report for International Application No. PCT/US2009/040606 dated Nov. 25, 2009, 3 pgs.

Written Opinion for International Application No. PCT/US2009/040606 dated Nov. 25, 2009, 4 pgs.

Supplementary European Search Report dated Jun. 25, 2010 for EP Application No. 08755080, 4 pgs.

Supplementary European Search Report dated Sep. 1, 2009 for EP Application No. 06813354, 4 pgs.

European Office Action dated Jun. 29, 2010 for EP Application No. 06813354.5, 4 pgs.

International Search Report for International Application No. PCT/US06/31070 dated Apr. 17, 2008, 3 pgs.

Written Opinion for International Application No. PCT/US06/31070 dated Apr. 17, 2008, 3 pgs.

International Search Report for International Application No. PCT/US2008/062744 dated Oct. 20, 2008, 3 pgs.

Written Opinion for International Application No. PCT/US2008/062744 dated Oct. 20, 2008, 4 pgs.

* cited by examiner

ELECTROHYDRAULIC TORQUE TRANSFER DEVICE

CROSS-REFERENCE TO RELATED APPLICATIONS

This application is a continuation-in-part of U.S. patent application Ser. No. 11/201,468 filed on Aug. 11, 2005, now U.S. Pat. No. 7,445,106. The disclosure of the above application is incorporated herein by reference.

BACKGROUND AND SUMMARY

The present disclosure relates generally to a power transmission device operable to selectively transfer torque between first and second sets of drivable wheels of a vehicle. More particularly, the present disclosure is directed to a power transmission device adapted for use in motor vehicle driveline applications having an actuator including an electric motor drivably coupled to a gerotor for providing pressurized fluid to a piston acting on a friction clutch.

Due to increased demand for four-wheel drive vehicles, many power transmission systems are typically being incorporated into vehicle driveline applications for transferring drive torque to the wheels. Many vehicles include a power transmission device operably installed between the primary and secondary drivelines. Such power transmission devices are typically equipped with a torque transfer mechanism for selectively transferring drive torque from the primary driveline to the secondary driveline to establish a four-wheel drive mode of operation. At least one known torque transfer mechanism includes a dog-type lock-up clutch that may be selectively engaged for rigidly coupling the secondary driveline to the primary driveline when the vehicle is operated in four-wheel drive mode. Drive torque is delivered only to the primary driveline when the lock-up clutch is released and the vehicle operates in a two-wheel drive mode.

Another type of power transmission device is operable for automatically directing drive torque to the secondary wheels without any input or action on the part of a vehicle operator. When traction is lost at the primary wheels, four-wheel drive mode is engaged. Some transfer cases are equipped with an electrically-controlled clutch actuator operable to regulate the amount of drive torque transferred to a secondary output shaft as a function of changes in vehicle operating characteristics such as vehicle speed, throttle position and steering angle.

While many power transfer devices are currently used in four-wheel drive vehicles, a need exists to advance the technology and recognize the system limitations. For example, the size, weight and packaging requirements of the power transmission device may make such systems cost prohibitive in some four-wheel drive applications.

The present disclosure provides a power transmission device including a friction clutch operable to selectively transfer torque between an input member and an output member. An actuator is operable to provide an actuating force to the friction clutch. The actuator includes an electric motor having an output shaft drivingly coupled to a gerotor. The gerotor is operable to provide pressurized fluid to a piston acting on the friction clutch. The gerotor substantially deadheads during actuation of the friction clutch.

The power transmission device may include a controller operable to determine a magnitude of torque to be transferred. The controller controls the actuator to pressurize fluid within a closed cavity containing a piston acting on a friction clutch to generate the requested magnitude of torque. The controller is operable to vary the supply of electrical energy to the motor via pulse width modulation to vary the output of a positive displacement pump and vary the output torque of the friction clutch. The motor is operable to continuously rotate while torque is being transferred by the friction clutch.

In addition, the power transmission device may include a valve between the pump outlet and the piston that selectively traps pressurized fluid acting on the piston without continued energization of the electric motor. A gerotor may be formed from a material having a first coefficient of thermal expansion and a housing formed from a material having a second lower coefficient of thermal expansion to vary pump component clearances as the viscosity of the pumped fluid changes with changes in temperature. A method of controlling the power transmission device includes defining a correlation between pump speed, fluid temperature and fluid pressure, determining fluid temperature, determining pump speed, and rotating the pump to transfer a predetermined quantity of torque.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application, or uses.

The present disclosure is directed to a power transmission device that may be adaptively controlled for modulating the torque transferred between a rotatable input member and a rotatable output member. The torque transfer mechanism may be useful within motor vehicle drivelines as a stand-alone device that may be easily incorporated between sections of propeller shafts, directly coupled to a driving axle assembly, or other in-line torque coupling applications. In particular, the torque transfer mechanism may form a part of an axle equipped with an electronically controlled limited slip differential. Accordingly, while the present disclosure is hereinafter described in association with a specific structural embodiment for use in a driveline application, it should be understood that the arrangement shown and described is merely intended to illustrate an exemplary embodiment of the present disclosure.

Figure 1:
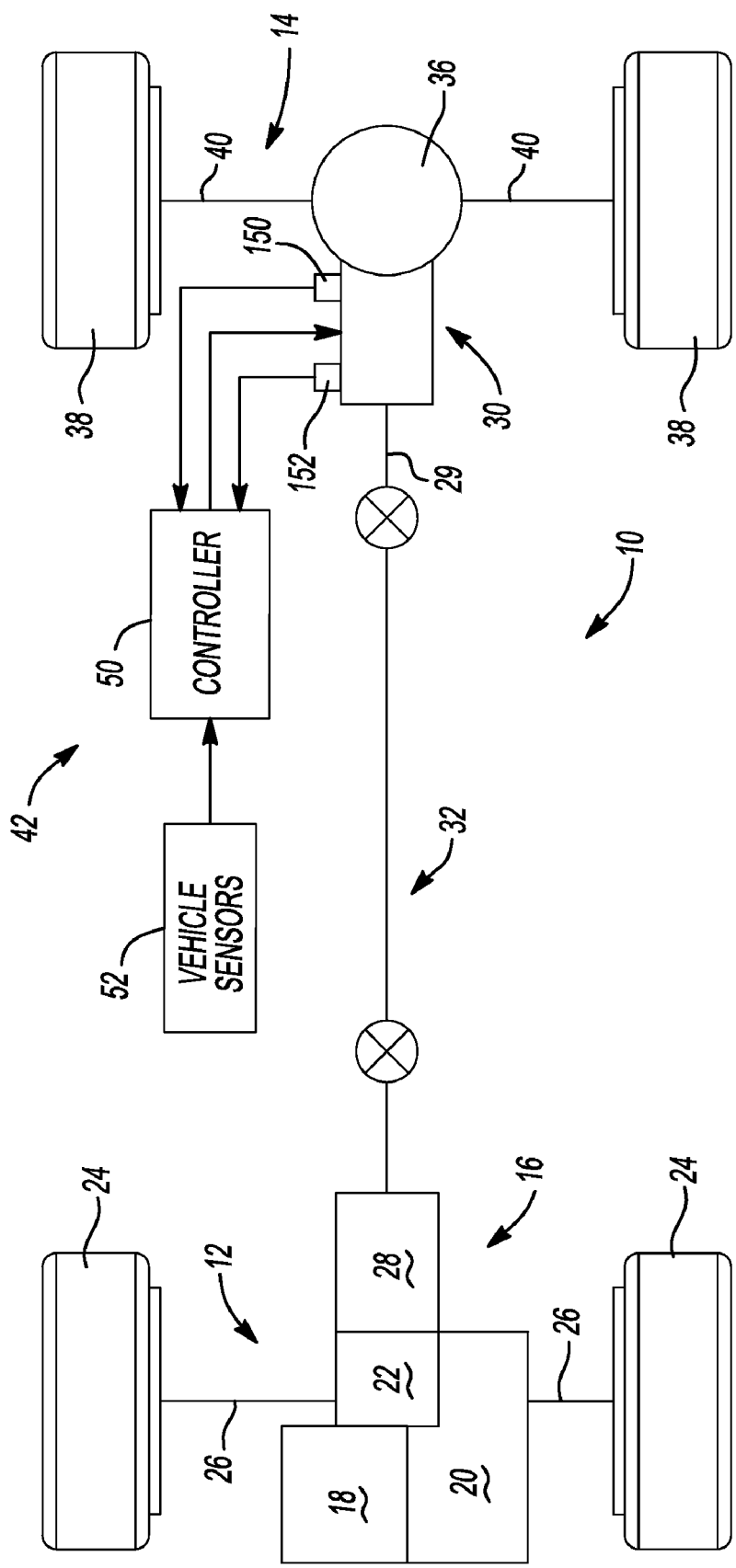
FIG. 1 is a schematic of a four-wheel drive vehicle equipped with a power transmission device of the present disclosure.

With reference to FIG. 1 of the drawings, a drive train 10 for a four-wheel vehicle is shown. Drive train 10 includes a first axle assembly 12, a second axle assembly 14 and a power transmission 16 for delivering drive torque to the axle assemblies. In the particular arrangement shown, first axle 12 is the front driveline while second axle 14 is the rear driveline. Power transmission 16 includes an engine 18 and a multi-speed transmission 20 having an integrated front differential unit 22 for driving front wheels 24 via axle shafts 26. A transfer unit 28 is also driven by transmission 20 for delivering torque to an input member 29 of a coupling 30 via a driveshaft 32. The input member 29 of the coupling 30 is coupled to driveshaft 32 while its output member is coupled to a drive component of a rear differential 36. Second axle assembly 14 also includes a pair of rear wheels 38 connected to rear differential 36 via rear axle shafts 40.

Drive train 10 is shown to include an electronically-controlled power transfer system 42 including coupling 30. Power transfer system 42 is operable to selectively provide drive torque in a two-wheel drive mode or a four-wheel drive mode. In the two-wheel drive mode, torque is not transferred via coupling 30. Accordingly, 100% of the drive torque delivered by transmission 20 is provided to front wheels 24. In the four-wheel drive mode, power is transferred through coupling 30 to supply torque to rear wheels 38. The power transfer system 42 further includes a controller 50 in communication with vehicle sensors 52 for detecting dynamic and operational characteristics of the motor vehicle. The controller is operable to control actuation of coupling 30 in response to signals from vehicle sensors 52. The controller 50 may be programmed with a predetermined target torque split between the first and second sets of wheels. Alternatively, the controller may function to determine the desired torque to be transferred through coupling 30 via other methods. Regardless of the method used for determining the magnitude of torque to transfer, controller 50 operates coupling 30 to maintain the desired torque magnitude.

Figure 2:
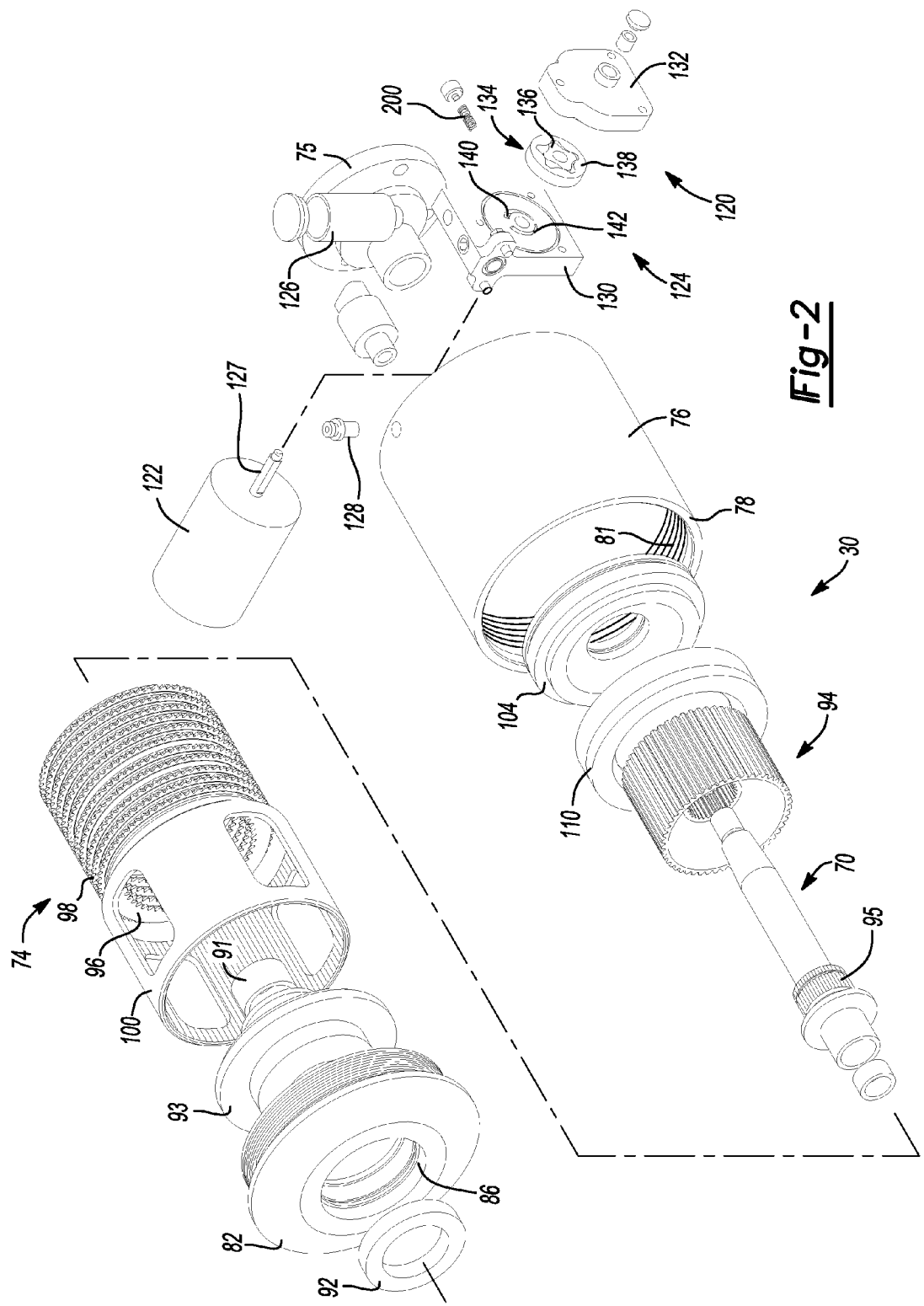
FIG. 2 is an exploded perspective view of an exemplary power transmission device.
Figure 3:
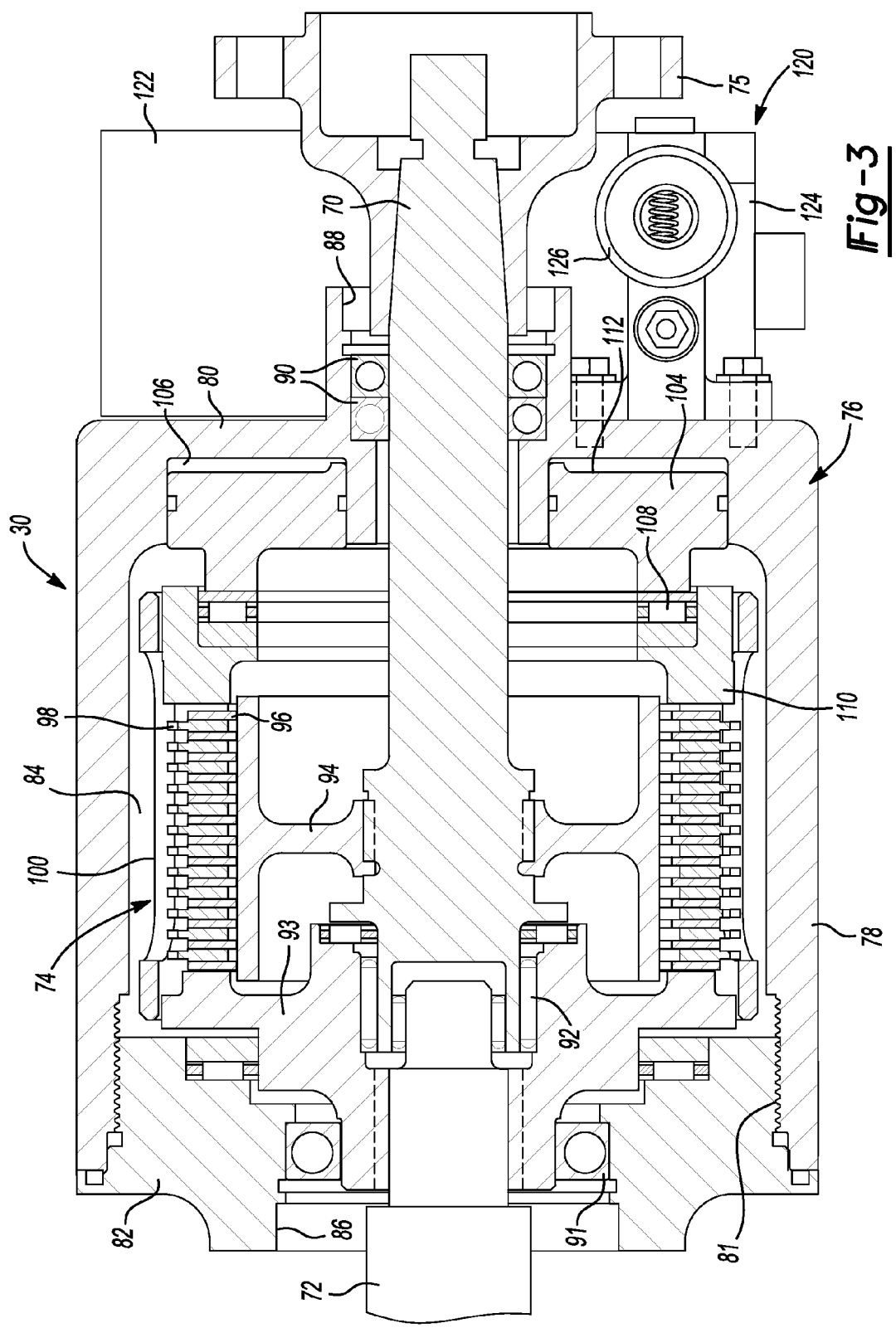
FIG. 3 is a cross-sectional side view of the power transmission device of FIG. 2.
Figure 4:
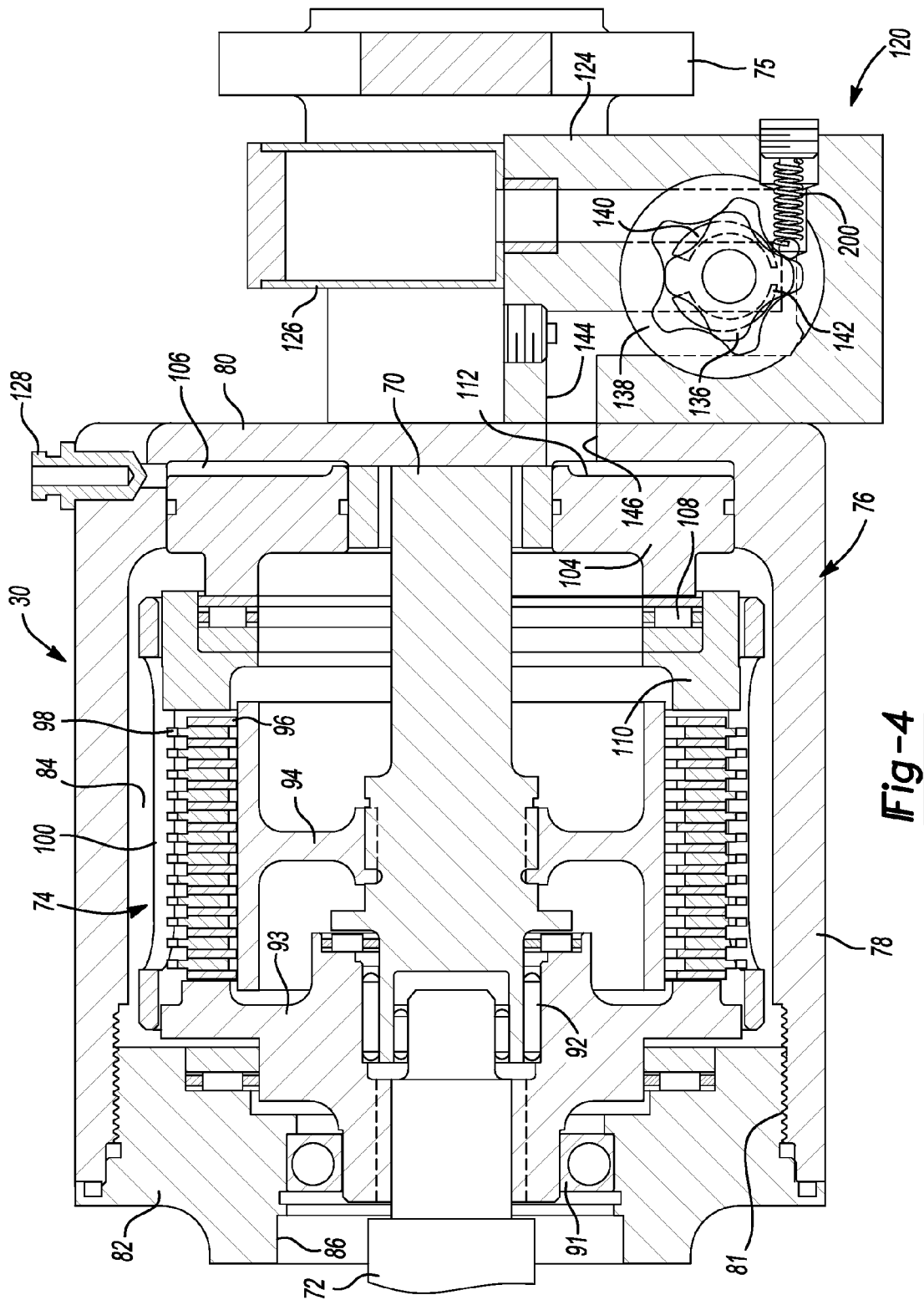
FIG. 4 is another cross-sectional side view of the power transmission device of FIG. 2.

FIGS. 2-4 depict coupling 30 in greater detail. Coupling 30 includes an input shaft 70 selectively drivingly coupled to an output shaft 72 via a friction clutch 74. A drive flange 75 is mounted on one end of input shaft 70 to provide a mounting provision for a driveline component such as driveshaft 32.

Coupling 30 includes a substantially cup-shaped housing 76 having a substantially cylindrically-shaped side wall 78 and an end wall 80. Side wall 78 includes an internally threaded portion 81 near the open end of housing 76. An end cap 82 is threadably engaged with threaded portion 81 to define a cavity 84. End cap 82 includes an aperture 86 extending therethrough. A portion of output shaft 72 extends through aperture 86. Housing 76 includes an aperture 88 extending through end wall 80. A portion of input shaft 70 extends through aperture 88. Bearings 90 are positioned within aperture 88 to rotatably support input shaft 70. Bearings 91 and 92 rotatably support an output spindle 93. Input shaft 70 includes a splined portion 95 (FIG. 2) drivingly coupled to a hub 94. A set of inner friction plates 96 are drivingly coupled to hub 94 via a splined engagement. Inner friction plates 96 are interleaved with a plurality of outer friction plates 98. Outer friction plates 98 are in splined engagement with a drum 100. Drum 100 is drivingly coupled to output spindle 93. Output spindle 93 is coupled with output shaft 72 via another splined interface. In the embodiment depicted, friction clutch 74 is a wet clutch. Accordingly, clutch fluid is contained within cavity 84 in communication with friction plates 96 and 98.

A piston 104 is slidably positioned within a cavity 106 formed within housing 76. Piston 104 is axially moveable into engagement with a thrust bearing 108 and an apply plate 110. When pressurized fluid acts on a face 112 of piston 104, piston 104 translates and applies a force through thrust bearing 108 and apply plate 110 to the plurality of interleaved clutch plates 96 and 98. Torque is transferred between input shaft 70 and output shaft 72 via the components previously described when friction plates 96 and 98 are forced into contact with one another.

An actuator 120 is mounted to housing 76 to selectively supply pressurized fluid to cavity 106 and provide an apply force to friction clutch 74. Actuator 120 includes an electric motor 122, a pump 124, and a reservoir 126. Electric motor 122 includes an output shaft 127 drivingly engaged with pump 124 such that rotation of the output shaft of the electric motor causes fluid within reservoir 126 to be pressurized and enter cavity 106. A bleed screw 128 is coupled to housing 76 in communication with cavity 106. Bleed screw 128 functions to allow an operator to purge trapped air from the closed hydraulic system. This minimizes the power required to compress trapped air.

Pump 124 includes a housing having a first half 130, a second half 132 and a gerotor 134. Gerotor 134 includes an inner gear 136 and an outer rotor 138 in engagement with one another. Inner gear 136 is drivingly coupled to the output shaft of electric motor 122. In operation, low pressure fluid passes through an inlet port 140 formed in housing half 130. Inlet port 140 is in fluid communication with reservoir 126. Rotation of inner gear 136 relative to outer rotor 138 causes a pumping action to force highly pressurized fluid through an outlet port 142 formed in housing half 130. Outlet port 142 is in fluid communication with a passageway 144 formed in pump housing half 130. Passageway 144 is positioned in fluid communication with an aperture 146 formed in housing 76. In this manner, fluid output from gerotor 134 is supplied to cavity 106 to act on piston 104.

One skilled in the art should appreciate that gerotor 134 acts on a closed volume of fluid located within passageway 144 and cavity 106. Because gerotor 134 acts on the closed volume of fluid, electric motor 122 rotates at a relatively high rpm for only a relatively short amount of time when the clearance between piston 104, thrust bearing 108, apply plate 110 and the interleaved friction plates 96 and 98 is eliminated. After the clearance has been taken up, piston 104 transfers force to apply plate 110 to cause friction clutch 74 to generate torque. At this time, piston 104 does not axially move and gerotor 134 enters a near dead-head mode. Due to the existence of a clearance between inner gear 136 and outer rotor 138 of gerotor 134, as well as a clearance between gerotor 134 and the pump housing, the output shaft of electric motor 122 continues to rotate inner gear 136 to maintain a desired pressure acting on piston 104. Some of the fluid trapped within passageway 144 and cavity 106 passes by inner gear 136 and outer rotor 138 in the reverse direction thereby allowing the output shaft of the electric motor to continue to rotate. If the gerotor were completely sealed and did not allow any backflow or blow by, the electric motor would be forced to stop due to the incompressible nature of the fluid being pumped by gerotor 134. In similar fashion, bleed screw 128 may be replaced with a small orifice connected to a passage back to the reservoir to define a self-bleeding system.

Figure 5:
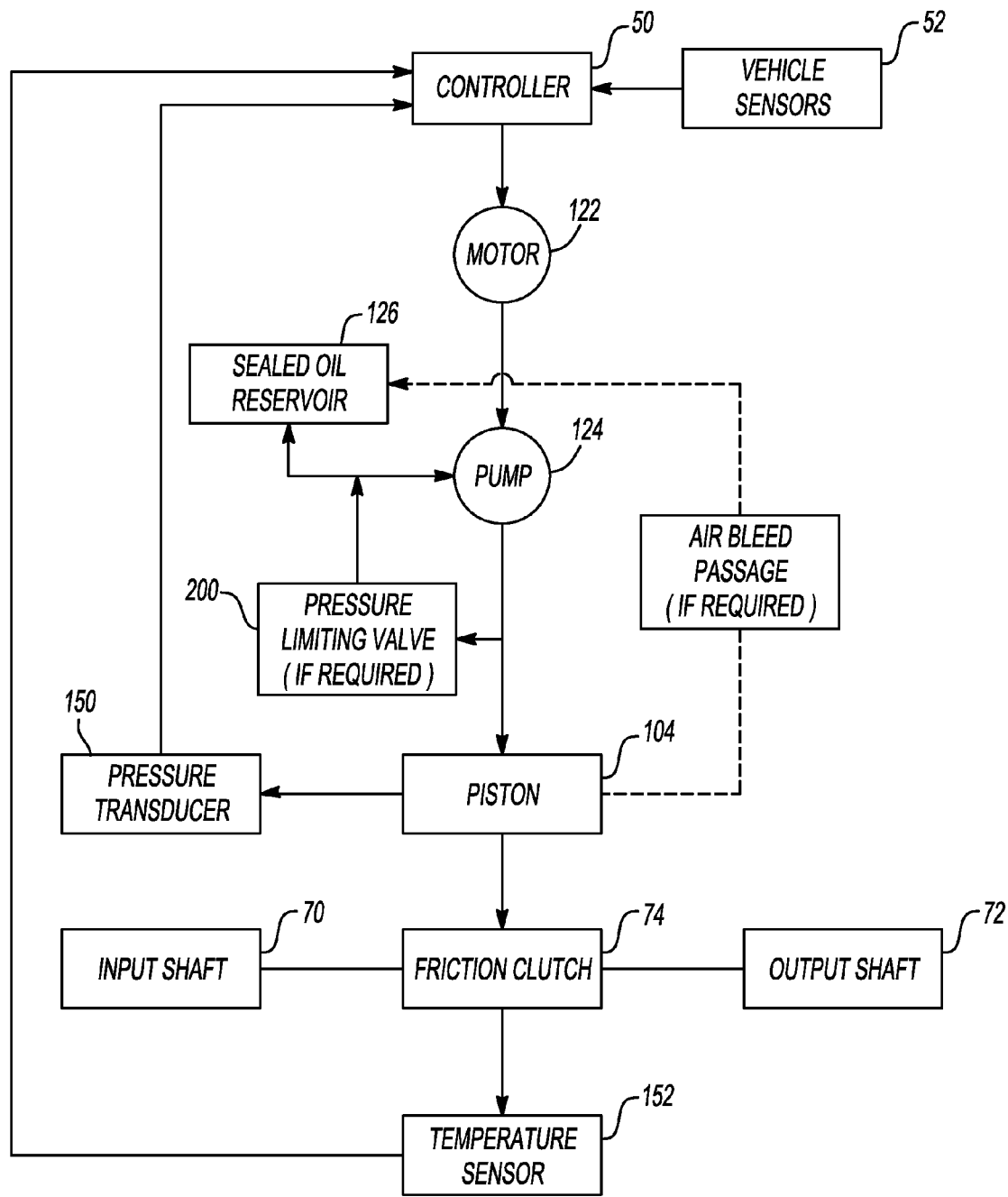
FIG. 5 is a schematic depicting the components of a torque transfer system including the power transmission device of the present disclosure.

As shown in FIG. 5, controller 50 is in communication with electric motor 122 as well as a pressure transducer 150. Pressure transducer 150 is operable to output a signal indicative of the fluid pressure within cavity 106. Controller 50 operates using a closed-loop feedback control to actuate electric motor 122 to maintain a target pressure acting on piston 104. Controller 50 is operable to provide a pulse width modulated signal to electric motor 122 to vary the output speed of the motor and the output pressure generated by pump 124. The pressure within cavity 106 should be proportional to the magnitude of torque output by friction clutch 74. By controlling the pressure maintained within cavity 106, the torque transferred through coupling 30 is controlled. Furthermore, a temperature sensor 152 is coupled to coupling 30 and is operable to provide controller 50 a signal indicative of the temperature of the clutch fluid contained within cavity 84. The controller 50 is programmed to vary the coupling control strategy based on clutch plate temperature. The control strategy attempts to protect the clutch fluid from overheating.

In an alternate embodiment, a pressure relief valve 200 (FIGS. 4 and 5) is plumbed in communication with the high pressure passageway 144. Pressure relief valve 200 is operable to allow pressurized fluid to pass from the high pressure side of pump 124 to the low pressure side at reservoir 126. Pressure relief valve 200 provides a path for the fluid within the previously described closed volume to escape. When pressure relief valve 200 allows flow therethrough, electric motor 122 may be operated at a higher rotational speed than previously described in the near dead-head operational mode of the pump. Depending on the type of electric motor fitted to coupling 30, it may be more or less desirable to incorporate pressure relief valve 200 into coupling 30. Specifically, if the electric motor may be operated for extended duration, it may not be necessary to include a pressure relief valve. On the contrary, if an electric motor design is chosen that must operate at higher rotational speeds, it may be desirable to include the pressure relief valve in order to provide a flow path for the fluid. It should also be appreciated that any number of gear arrangements may be inserted between the output shaft of electric motor 122 and the inner gear 136 of gerotor 134 thereby allowing the motor to operate a higher rotational speed while rotating the pump components at a low rotational speed. If a speed reducing gearset is used, a pressure relief valve is not necessarily required.

Figure 6:
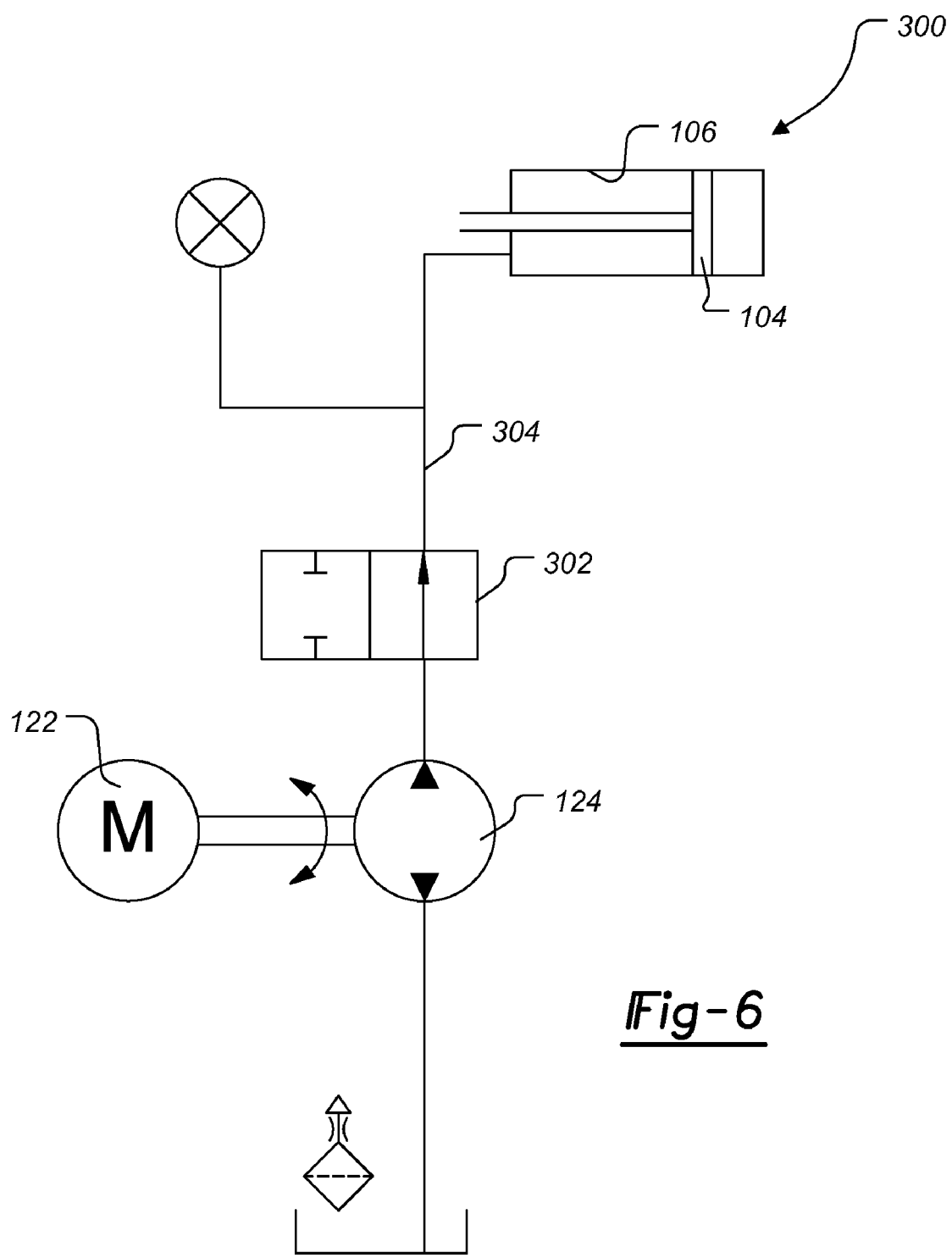
FIG. 6 is a schematic of a hydraulic system for controlling the power transmission device of the present disclosure.

FIG. 6 provides a schematic of a hydraulic system 300 including motor 122, pump 124 and piston 104. Hydraulic system 300 also includes a two position valve 302 positioned in series between pump 124 and piston 104. When valve 302 is in the open position, motor 122, pump 124 and piston 104 act to apply and release compressive forces to friction clutch 74 as previously described. During certain modes of operation, it may be desirable to provide a maximum force to the friction clutch to operate coupling 30 in a locked-up mode. Without valve 302 in place, motor 122 runs substantially continuously at a relatively high load to provide a high output fluid pressure from pump 124 acting on piston 104.

To reduce the time that motor 122 is required to be energized, hydraulic system 300 is invoked. In particular, motor 122 drives pump 124 to produce a pressure magnitude sufficient to drive piston 104 into friction clutch 74 and actuate coupling 30 at its maximum torque transfer value. At this point, two position valve 302 is shifted to trap pressurized fluid within a passageway 304 and cavity 106. It should be appreciated that two position valve 302 is not controlling the pressure applied to piston 104 but merely maintains a previously applied pressure provided by motor 122 and pump 124. As such, coupling 30 will continue to be controlled in the manner previously described. For example, if control dictates that coupling 30 should be in the open, non torque transferring mode, valve 302 is shifted to the open position and motor 122 is operated in the reverse direction to reduce the pressure acting on piston 104 and thereby reduce the torque transferred by coupling 30.

Figure 7:
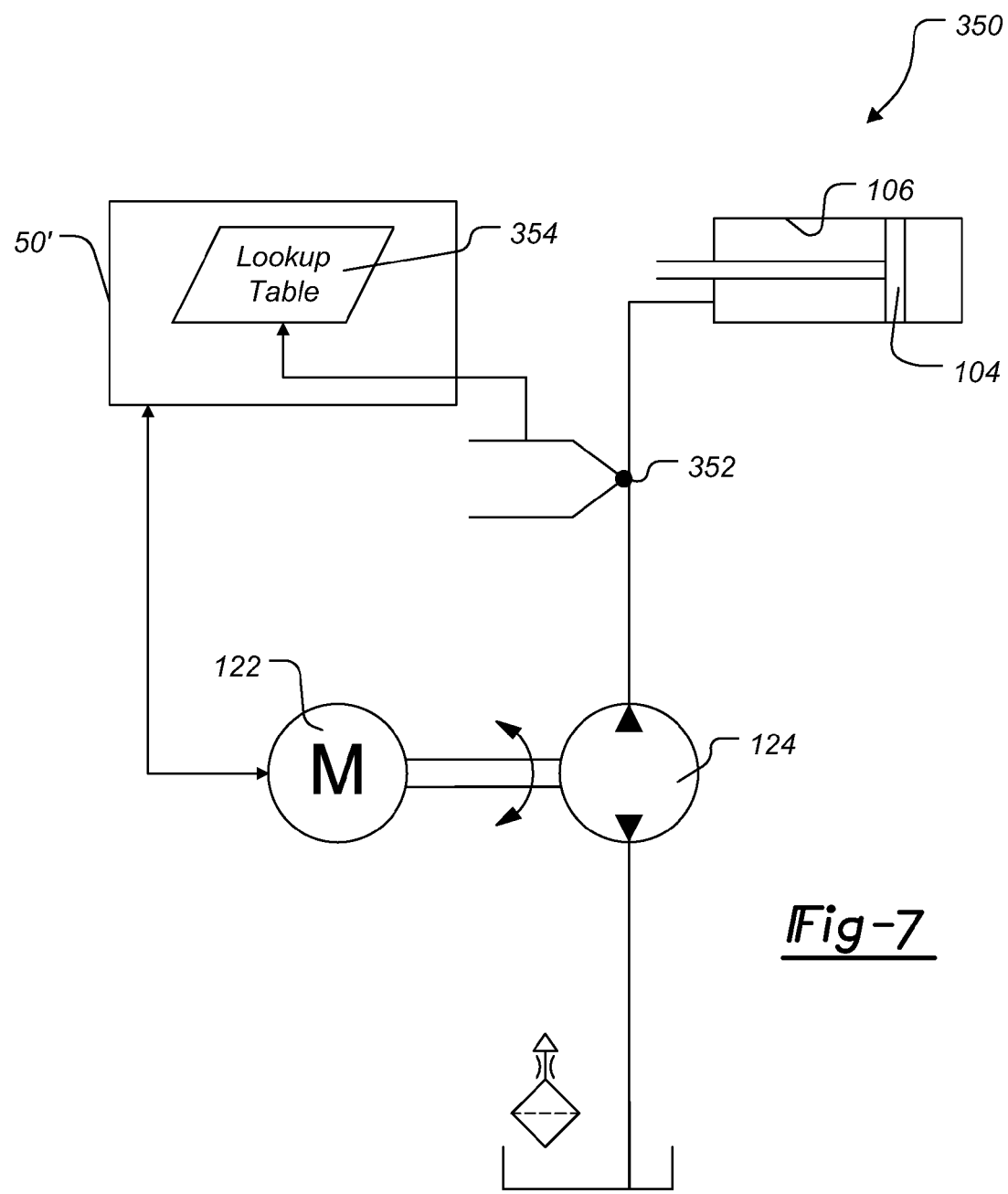
FIG. 7 is a schematic depicting another control system for the power transmission device.

FIG. 7 depicts another hydraulic system 350 for controlling operation of coupling 30. Hydraulic system 350 includes motor 122, pump 124 and piston 104. Hydraulic system 350 also includes a thermocouple 352 operable to output a signal indicative of the temperature of the fluid output by pump 124. For a given fluid, pumped by pump 124, the viscosity of the fluid varies with temperature. As such, the pressure of fluid output by pump 124 varies with fluid temperature and pump speed. Furthermore, for a given fluid temperature, the fluid pressure output by pump 124 varies as a function of motor pump speed.

A controller 50' includes a look-up table 354 charting pump output pressures as pump speed and fluid temperature varies. Controller 50' may be programmed with another relation correlating the pump output pressure to force applied by piston 104 and ultimately torque generated by coupling 30. Accordingly, given a requested magnitude of torque to transfer across coupling 30, controller 50' reads the current temperature of fluid being pumped by pump 124 and calculates a motor speed required to rotate pump 124 at the desired rotational speed and provide the requisite apply force from piston 104. Hydraulic system 350 allows control of coupling 30 without the use of a pressure sensor in communication within the fluid positioned within cavity 106. Hydraulic system 350 may be viewed as a reduced cost arrangement because the cost of thermocouple 352 is substantially less than the cost of a pressure transducer. In operation, as the viscosity of the fluid being pumped changes, the speed of motor 122 and pump 124 may be varied to maintain a desired pressure output.

Figure 8:
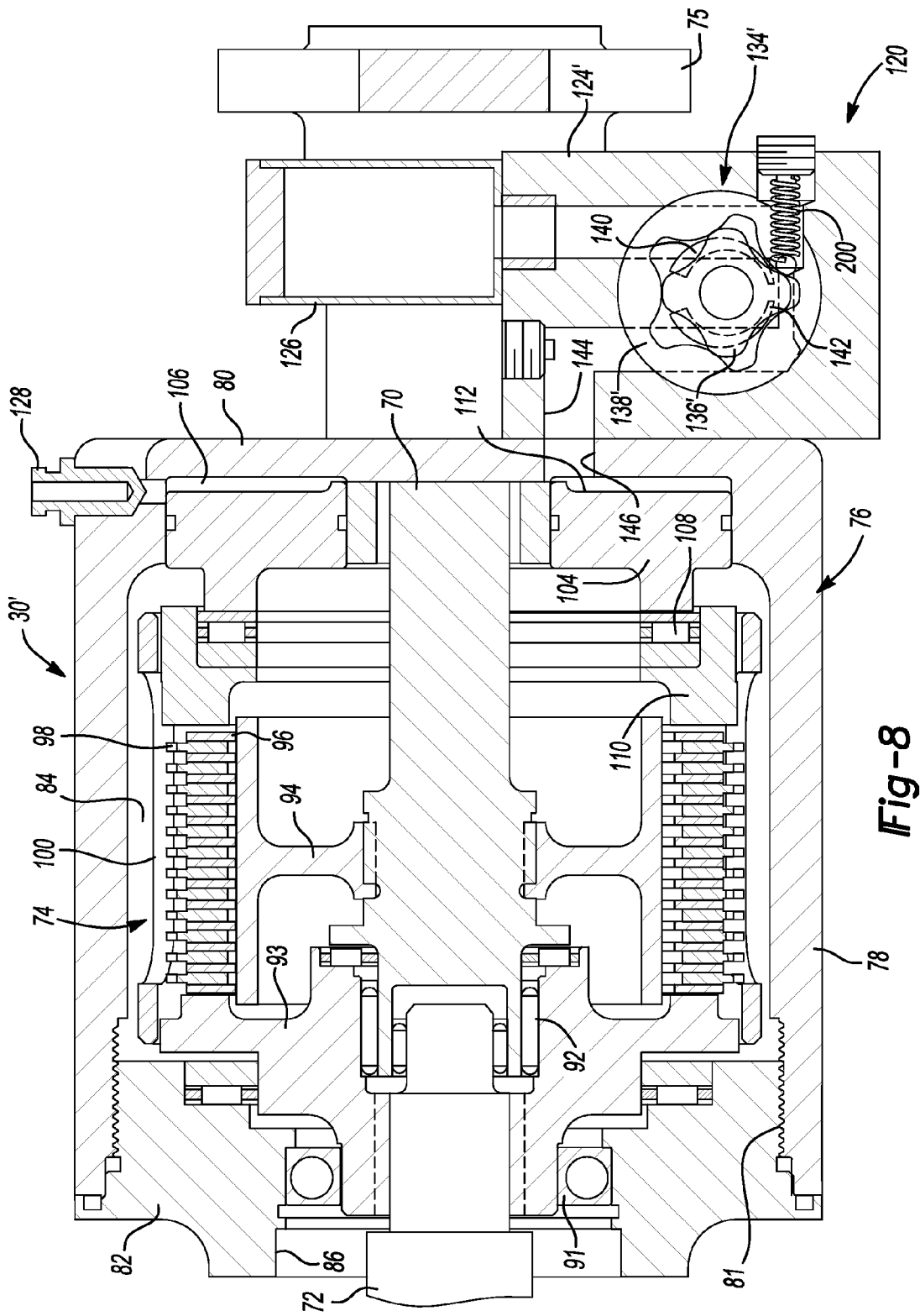
FIG. 8 is a cross-sectional side view of another power transmission device.

FIG. 8 depicts another coupling 30' substantially similar to coupling 30 other than a pump 124' being provided. Pump 124' provides a temperature compensation feature that will be described in greater detail. As previously mentioned with reference to coupling 30 and pump 124, motor 122 is powered to rotate pump 124 to displace a volume of fluid at a target output pressure thereby causing piston 104 to apply a target force to friction clutch 74 and generate a predetermined torque output. Once the desired pressure has been achieved, and if a torque request is still active, motor 122 continues to rotate at a speed that compensates for the reverse flow of fluid through gerotor 134.

Fluid passing through gerotor 134 in the opposite direction from the pumping direction may be characterized as leakage. Gerotor leakage is a function of clearances between inner gear 136 and outer rotor 138 of gerotor 134, the gerotor 134 to pump housing clearances, the hydraulic fluid viscosity and the pump operating pressure. The pump component clearances and pump size are defined such that motor 122 runs in an efficient region of its speed-torque output while achieving desired coupling torque transfer response times. As coupling 30 functions in a variety of operating temperatures, the viscosity of the pumped fluid changes.

With a given quantity of pump component clearances, pump operation at cold temperature includes moving increased viscosity fluid which results in increased viscous drag within pump 124. An increased load on motor 122 occurs. Lowering the speed of operation of motor 122 may negatively affect its efficiency. When operating coupling 30 at a relatively high operating temperature, the pumped fluid viscosity is reduced. An increase in leakage or back flow through pump 124 occurs. The additional leakage may result in a required motor speed greater than the desired operational motor speed range. Motor 122 may be unable to provide the motor torque required to generate a requested output pressure from pump 124.

Coupling 30' equipped with pump 124' addresses gerotor pump operation over a range of temperatures. Pump 124' includes an inner gear 136' constructed from a first material and an outer rotor 138' also constructed from the first material. Housing first half 130 and second half 132 of pump 124 is constructed from a second material other than the first material. The first material includes a first coefficient of thermal expansion. The second material is a different coefficient of thermal expansion. In particular, it is contemplated that inner gear 136 and outer rotor 138 have a higher coefficient of thermal expansion than the first and second halves 130, 132 of the pump housing. By selecting an appropriate differential and thermal expansion coefficients, it is possible to tune pump 124 for improved performance consistencies through its temperature operating range and the corresponding change in pumped fluid viscosity.

For example, with the configuration previously described, gerotor 134' reduces in size relative to the pump housing during cold temperature operation. An increased clearance between the gerotor 134 and the pump housing reduces a viscous drag experienced by the pump due to the increased fluid viscosity.

During high temperature operation, inner gear 136 and outer rotor 138 increase in size at a rate greater than the increase in size of first half 130 and second half 132. A decreased clearance between gerotor 134 and the pump housing results. The decreased clearance reduces leakage in the reverse direction through pump 124 and allows motor 122 to run at an efficient speed.

Figure 9:
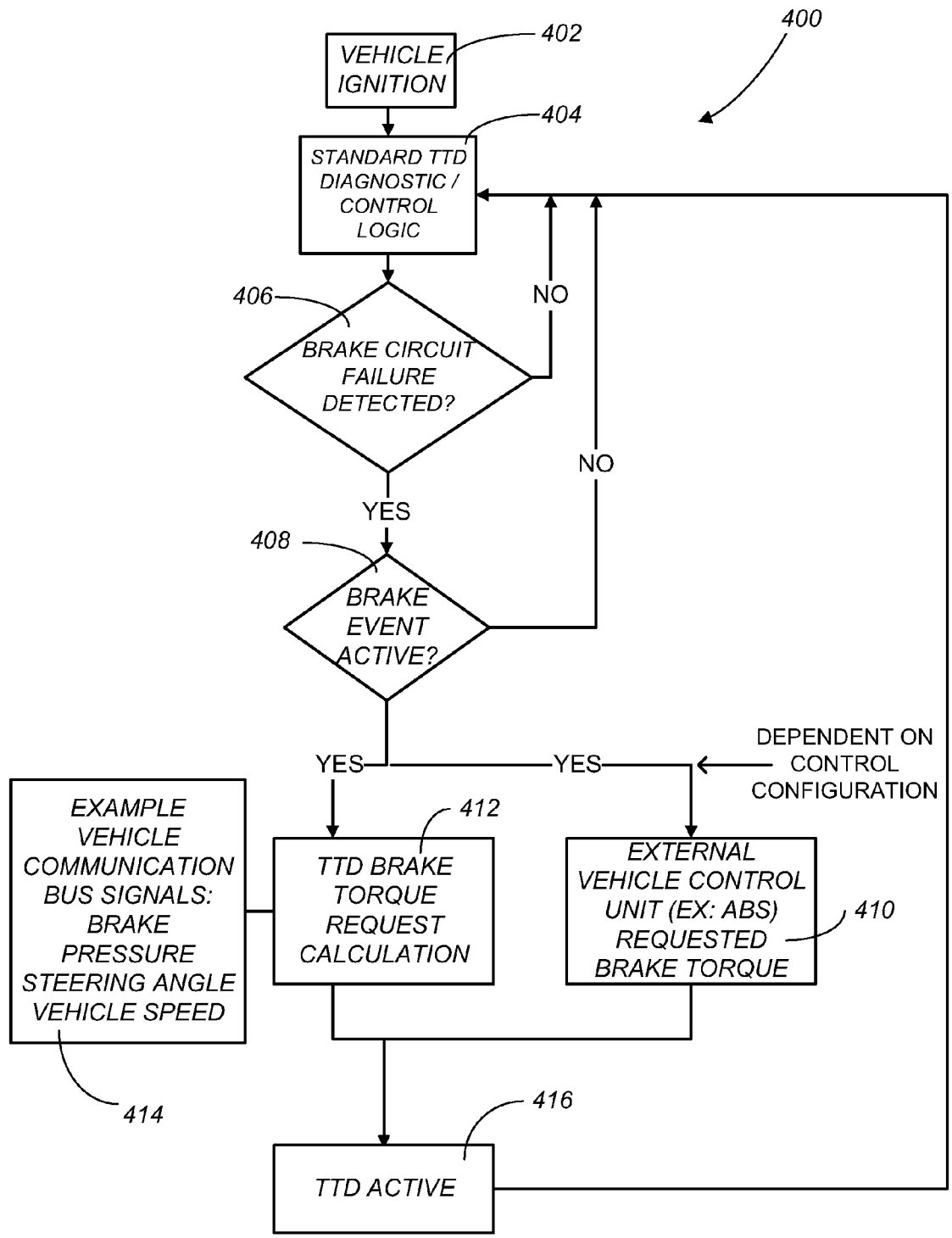
FIG. 9 is flow diagram relating to a power transmission device control method for a failed brake circuit.

A method of controlling coupling 30 in the event of a failed brake circuit indicated at reference numeral 400 is now described. A flow diagram representing the control method is depicted at FIG. 9.

Many modern production vehicles are equipped with a brake system with two separate hydraulic circuits. A first circuit is typically operable to actuate half of the brakes of the vehicle while the second circuit is operable to actuate the other half of the vehicle brakes. The brake systems may be configured as having circuits actuating brakes positioned diagonally across the vehicle from one another or the brakes laterally aligned with one another such that the first brake circuit would actuate the front vehicle brakes while the second hydraulic circuit actuates the rear vehicle brakes.

Two hydraulic circuits are used to provide a redundant system if one of the hydraulic circuits should fail. In a diagonal system, if one of the brake circuits fails, the vehicle may be decelerated with one front brake and one diagonally opposite rear brake being operational. Alternatively, in the case of a front-back split, one axle would remain to provide all of the braking force to decelerate the vehicle. Concerns exist regarding vehicle stability when only one brake circuit is functional. In the case of a failed diagonal circuit, a yaw moment may be induced by the imbalance of brake forces across the vehicle. As such, the driver may be required to input a steering correction to counteract the yaw moment. In the case of a failed front axle hydraulic circuit, with a front-back split configuration, an over-steer condition may occur if all of the braking force is provided at the rear axle. Stopping distance may be improved if the remaining brake circuit is able to provide a pressure level which would lock the active circuit's wheels. Brake torque is shared to the additional tires.

Coupling control method 400 involves controlling coupling 30 to transfer torque to at least one of the wheels associated with the failed hydraulic circuit. In one configuration, the failed brake circuit is recognized by the brake system or the vehicle controller and the failure mode information is provided to the vehicle communication bus.

As shown in FIG. 9, the control method for coupling control in view of a failed brake circuit includes vehicle ignition being turned on at block 402. At block 404, a standard torque transfer device diagnostic and a control logic is implanted as previously described. At block 406, it is determined if a brake circuit failure has been detected by controller 50. If a brake circuit failure has not been detected, control returns to block 404. If a brake circuit failure has been detected, block 408 determines if a brake event is currently active. If braking is not presently occurring, control returns to block 404. If a brake circuit failure has been detected and current braking is occurring, control continues to another vehicle control unit represented at block 412. Block 412 calculates a quantity of torque to be transferred through coupling 30. Block 414 contains a variety of information used possibly including a brake pressure signal, a steering angle signal and a vehicle speed signal. At block 416, coupling 30 is activated to transfer the torque requested at block 412. Once coupling 30 transfers torque during a braking event, wheels that are associated with the active brake circuit transfer torque through the driveline to wheels that are associated with the failed brake circuit. As such, retardation force is provided at the wheels where the brakes are inoperative.

It should be appreciated that coupling 30 may be alternatively or concurrently controlled by another vehicle control unit as shown at block 410. Block 410 represents additional vehicle controls that may occur outside controller 50 such as anti-lock braking system control. Control of the anti-lock braking system may call for further brake actuation.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without department from the spirit and scope of the disclosure as defined in the following claims.

What is claimed is:

1. A power transmission device comprising:
a rotatable input member;
a rotatable output member;
a friction clutch selectively transferring torque between the input member and the output member; and
an actuator providing an actuation force to the friction clutch, the actuator including an electric motor coupled to a pump, the pump having an outlet supplying pressurized fluid to a piston positioned within a closed volume, the piston acting on the friction clutch to generate a predetermined torque;
a valve positioned in series between the pump outlet and the piston, the valve being moveable between a first position allowing fluid communication between the pump outlet and the piston and a second position where pressurized fluid acting on the piston is trapped between the piston and the valve to maintain the predetermined torque output of the friction clutch without continued energization of the electric motor; and
a controller to determine whether the friction clutch is to be operated in a locked mode for a predetermined amount of time greater than a minimum threshold, the controller signaling the valve to move to the second position to place the friction clutch in the locked mode.

2. The power transmission device of claim 1 wherein the valve is a two-position valve.

3. A method of transferring torque between a rotatable input member and a rotatable output member, the method comprising:
energizing an electric motor to drive a pump to selectively supply pressurized fluid from an outlet of the pump to a chamber containing a piston;

translating the piston into contact with a friction clutch to apply an actuation force on the clutch proportional to the pressure of the fluid;

controlling the magnitude of torque transferred by the friction clutch by varying the speed of the electric motor;

positioning a valve between the outlet of the pump and the piston;

placing the friction clutch in a locked mode by increasing the magnitude of pressure applied to the piston to restrict clutch slippage;

maintaining the friction clutch in the locked mode by moving the valve to a closed position;

trapping pressurized fluid between the valve and the piston to maintain the pressure applied to the piston without further energizing the electric motor; and placing the friction clutch in an open mode by moving the valve to an open position and reversing the direction of the electric motor to pump fluid away from the piston to reduce the torque transferred by the friction clutch.

4. A method of controlling a power transmission device for drivingly coupling a rotatable input member and a rotatable output member, the method comprising:

energizing an electric motor to drive a pump to selectively supply pressurized fluid from an outlet of the pump to a chamber containing a piston;

defining a correlation between a pump speed, a fluid temperature and a fluid pressure output from the pump;

determining a temperature of the pumped fluid;

determining a pump speed to provide a predetermined fluid pressure;

defining a correlation between the fluid pressure and a clutch torque; and rotating the pump at the determined speed to provide the predetermined fluid pressure to a piston acting on the clutch to transfer a predetermined quantity of torque between the rotatable input member and the rotatable output member.

5. The method of claim 4 wherein defining the correlation includes storing a look-up table.

6. The method of claim 5 wherein the look-up table is populated by empirically testing the pump.

7. The method of claim 4 wherein determining the fluid temperature includes obtaining a signal from a thermocouple in communication with the pumped fluid.

8. The method of claim 4 further including placing another fluid separate from the pumped fluid in contact with the clutch.

9. A power transmission device comprising:
a rotatable input member;
a rotatable output member;
a friction clutch for transferring torque between the input member and the output member; and
an actuator for providing an actuation force to the friction clutch, the actuator including an electric motor having an output shaft drivingly coupled to a pump rotatably positioned within a housing, the pump being operable to supply pressurized fluid to a piston acting on the friction clutch, the pump including a gerotor including an inner gear and an outer rotor, each being formed from a first material and having a first coefficient of thermal expansion, the housing being formed from a second material having a second coefficient of thermal expansion lower than the first coefficient of thermal expansion to vary pump component clearances as the viscosity of the pumped fluid changes with changes in temperature.

10. The power transmission device of claim 9 wherein the piston is positioned within a closed cavity in communication with an outlet port of the gerotor.

11. The power transmission device of claim 10 wherein pressurized fluid within the closed cavity is forced to pass through the gerotor in a direction opposite to the pumping direction when a force is being applied by the piston.

12. The power transmission device of claim 11 wherein a clearance between the gerotor and the housing increases when a decrease in temperature occurs.

13. The power transmission device of claim 12 wherein the increased clearance allows the electric motor to pump the increased viscosity fluid at substantially the same speed.

14. The power transmission device of claim 11 wherein a clearance between the gerotor and the housing decreases when an increase in temperature occurs.

15. A method of controlling a power transmission device for drivingly coupling a rotatable input member and a rotatable output member, the method comprising:

determining whether a brake circuit failure has been detected;

determining whether a braking event is active;

calculating an amount of torque to be transferred by the power transmission device; and transferring torque from an active vehicle brake through the power transmission device to a wheel associated with an inactive vehicle brake.

16. The method of claim 15 wherein transferring torque through the power transmission device includes energizing an electric motor to drive a pump to selectively supply pressurized fluid to a chamber containing a piston and transferring an actuation force from the piston to a clutch of the power transmission device.

17. The method of claim 16 further including operating the power transmission device as an all wheel drive clutch when a braking event is not active.

18. The method claim 17 wherein calculating the amount of torque to be transferred by the power transmission device is performed by one of a power transmission device controller and a vehicle controller.

* * * * *